United States Patent [19]

Temple et al.

[11] Patent Number: 5,396,987
[45] Date of Patent: Mar. 14, 1995

[54] CONTAINERS FOR COMPACT DISCS

[75] Inventors: James M. Temple; James A. Bergh, both of Boulder, Colo.

[73] Assignee: Case Logic, Inc., Longmont, Colo.

[21] Appl. No.: 175,920

[22] Filed: Dec. 30, 1993

[51] Int. Cl.6 .......................................... B65D 85/57
[52] U.S. Cl. .................. 206/309; 206/312; 206/484
[58] Field of Search .............. 206/307, 309, 310, 311, 206/312, 313, 444, 484

[56] References Cited

U.S. PATENT DOCUMENTS

| | | |
|---|---|---|
| 4,519,500 | 5/1985 | Perchak . |
| 4,620,630 | 11/1986 | Moss . |
| 4,622,531 | 11/1986 | Eyssa et al. . |
| 4,627,531 | 12/1986 | Clemens . |
| 4,687,101 | 8/1987 | Barker, Sr. et al. ............ 206/312 X |
| 4,762,225 | 8/1988 | Henkel ................ 206/311 |
| 4,850,731 | 7/1989 | Youngs . |
| 4,863,032 | 9/1989 | Bothe et al. .................... 206/312 X |
| 4,978,005 | 12/1990 | Sammet . |
| 5,048,681 | 9/1991 | Henkel ................ 206/312 |
| 5,085,318 | 2/1992 | Leverick ............ 206/312 |
| 5,101,973 | 4/1992 | Martinez . |
| 5,209,353 | 5/1993 | Lehtovaara . |
| 5,255,785 | 10/1993 | Mackey ................ 206/309 |
| 5,332,089 | 7/1994 | Tillett et al. .................... 206/309 X |

Primary Examiner—Jacob K. Ackun, Jr.
Attorney, Agent, or Firm—Francis A. Sirr; Earl C. Hancock

[57] ABSTRACT

A container for compact discs comprises a lightweight sleeve formed of three thin sheets of polypropylene material that are die cut and heat bonded together. A front pocket has a deep U-shaped notch formed on its outer face and provides for insertion of a Compact Disc (CD). A back pocket is provided for a printed CD package insert. On both the front surface and the back surface, a pocket is formed at the top of the container to receive a narrow, information bearing strip, such as the title bar from a jewel box.

13 Claims, 3 Drawing Sheets

CONTAINERS FOR COMPACT DISCS

BACKGROUND OF THE INVENTION

1. Field of the Invention

This invention relates to apparatus and methods for efficiently storing compact discs. More particularly, this invention relates to apparatus and methods for storing a compact disc in a portable, thin, flexible, three ply container so as to facilitate both physical and visual access to the disc and to printed and graphic information relating to the disc.

2. Description of the Prior Art

Traditionally, compact discs (CDs) are sold and stored in well-known rigid and relatively thick plastic jewel boxes. Typical jewel boxes include removable inserts having one, or more, narrow title bars along at least one narrow edge to thereby permit the owner to find a particular compact disc when a number of the Jewel boxes are stacked, or stored, next to each other. Additionally, jewel boxes typically contain a large package insert listing the songs on the CD and showing a graphic illustration provided by artists.

CDs are thin and relatively rugged. The amount of protection that is provided by a jewel box is more than necessary in most circumstances. However, jewel boxes are unnecessarily bulky, thus limiting the number of CDs that can be carried or stored in any given carrier or cabinet.

Accordingly, relatively thin sleeves for storing individual CDs have evolved to protect the disc surface from dust, scratching and the like. For instance, U.S. Pat. No. 4,850,731 by Youngs, incorporated herein by reference, discloses a plastic storage sleeve for CDs comprising a plastic cover having a pocket for a CD and another pocket for an information insert. However, the owner must pull a sleeve of this type out of a stack of such sleeves in order to see which CD is contained in any given sleeve.

Publications of general interest include U.S. Pat. No. 4,519,500 which teaches a package for a computer disk wherein a hinge portion includes an elongated channel for holding indicia identifying the contents of the package. U.S. Pat. No. 4,978,005 teaches a compact disc container wherein an identifier card can be connected thereto. U.S. Pat. No. 4,620,630 teaches an enclosure for a compact disc that is foldable once the container is removed from its merchandising holder. U.S. Pat. No. 4,627,531 teaches a recording disc enclosure wherein visual symbols may be disposed upon portions of the enclosure. U.S. Pat. No. 5,101,973 teaches a compact disc case having a flap with a detachable portion for use in mailing. U.S. Pat. No. 5,209,353 teaches a diskette filing system having an identification label.

A need remains in the art for a CD container which requires minimal storage volume while protecting the CD surface in a manner that permits the user to quickly identify and locate a CD without removing the container from a stack of such containers.

SUMMARY OF THE INVENTION

The present invention provides a relatively thin and flexible three ply container for holding a compact disc. A first transparent and flexible plastic film, a flexible intermediate plastic member, and a second flexible plastic film are arranged in that order. The first film, intermediate member, and second film each have a generally similar rectangular shape; for example, square. The first film, intermediate member, and second film each have a top edge, a bottom edge, a first side edge, and a second side edge. A sealing line-type heat seal binds the first film, intermediate member and second film together at their top edge, bottom edge, first side edge, and second side edge, to thereby form a unitary flexible member. A second line-type heat seal binds the first film to the intermediate member, this second seal means extending generally parallel to the top edge and spaced relatively close to the top edge to thereby form an elongated first pocket between a first surface of the first film and a first surface of the intermediate member. A first cut is formed in the first film generally adjacent to one of said the edges, this first cut enabling an elongated alphanumeric/graphic card identifying a compact disc to be inserted into the first pocket. A generally U-shaped notch is cut into the first film, this notch extending generally from the second seal at locations generally adjacent to the side edges and terminating at a location that is spaced from the bottom edge. This notch enables a compact disc to be inserted into a second pocket between the first surface of the first film and the first surface of the intermediate member.

As a feature of the invention, the first film, intermediate member and second film each comprise polypropylene, and the first surface of the intermediate member is formed of a relatively soft polypropylene material.

As a further feature of the invention, the second film is transparent, and a second cut is formed in the second film generally adjacent to the top edge and extends generally parallel to the top edge. This second cut enables a flat alphanumeric/graphic card identifying a compact disc to be inserted into a third pocket between a first surface of the second film and a second surface of the intermediate member.

As a further feature of the invention, a third line-type heat seal binds the second film to the intermediate member at a location intermediate the second cut and the top edge. This third seal extends generally parallel to the top edge, and is spaced relatively close to the top edge to thereby form an elongated pocket between the first surface of the second film and the second surface of the intermediate member. Third and fourth cuts are formed in the second film generally adjacent to the side edges, these cuts enabling an elongated alphanumeric/graphic card identifying a compact disc to be inserted into a pocket.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
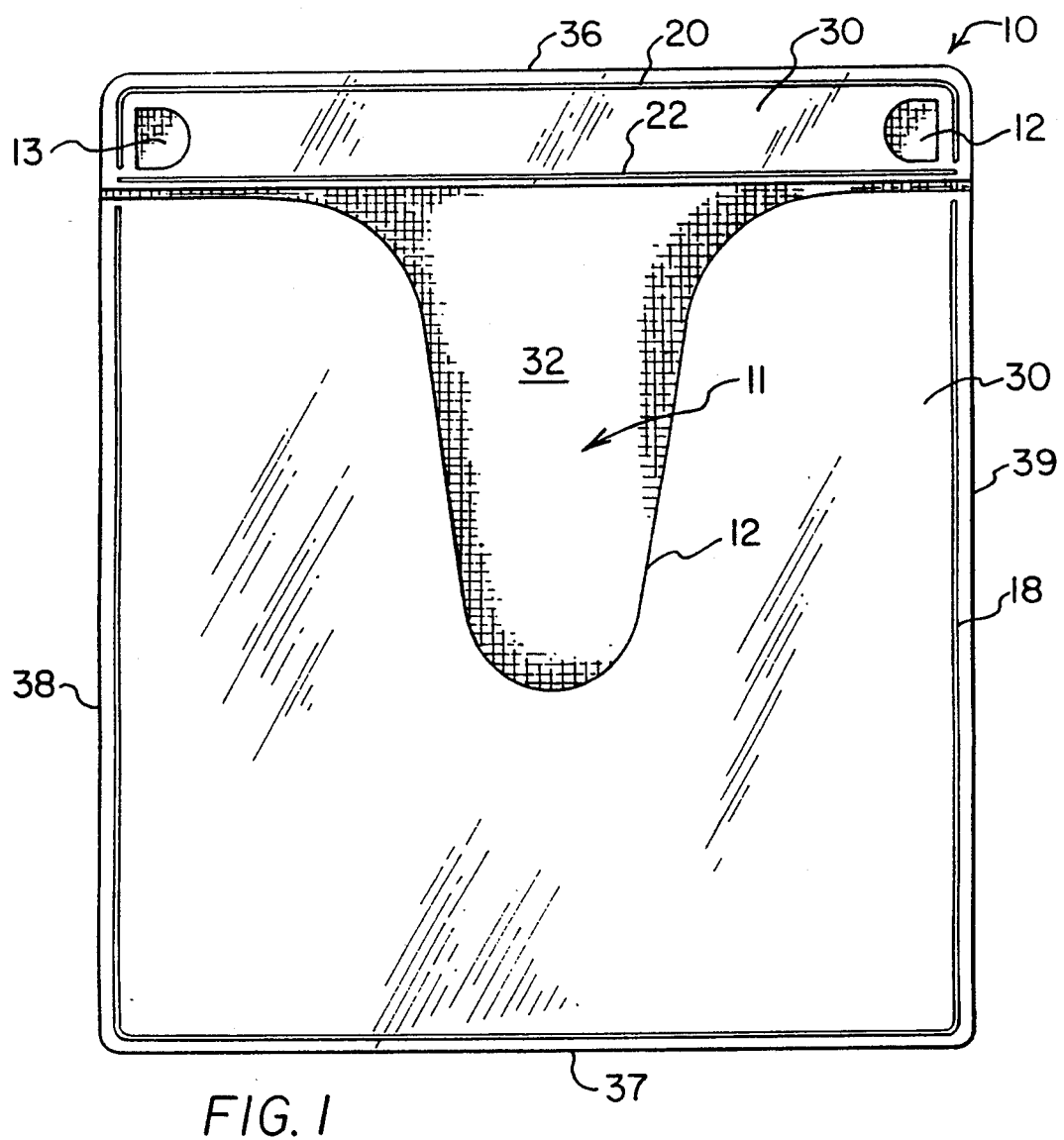
FIG. 1 is a front view of the invention.

FIG. 1 is a front view of the invention. The invention comprises a container 10 that is formed of three thin layers or plies of plastic material 30, 33 and 31 (FIG. 3), preferably, but without limitation thereto, polypropylene. Layers 30, 33, and 31 are heat sealed together in a new and unusual line-type heat seal pattern, as will be described.

Hatched areas 11, 12 and 13 of FIG. 1 show where portions of the top polypropylene layer 30 have been cut away, revealing second layer 32 underneath. Cutaway 12, in layer 30, forms a deep U-shaped notch that is provided to allow a user to grasp CD 28 (shown in FIG. 2), in order to remove CD 28 from a pocket that is formed between layer 30 and layer 32.

D-shaped cutaways 14 and 16 in layer 30 allow insertion of a CD title bar 17 from either side of container 10.

Thin line type heat seals 18, 20 and 22 seal selected portions of the three polypropylene layers together. U-shaped heat seal 18 forms a first pocket which holds CD 28. Heat seals 20 and 22 form a second pocket which holds CD title bar 17.

Figure 2:
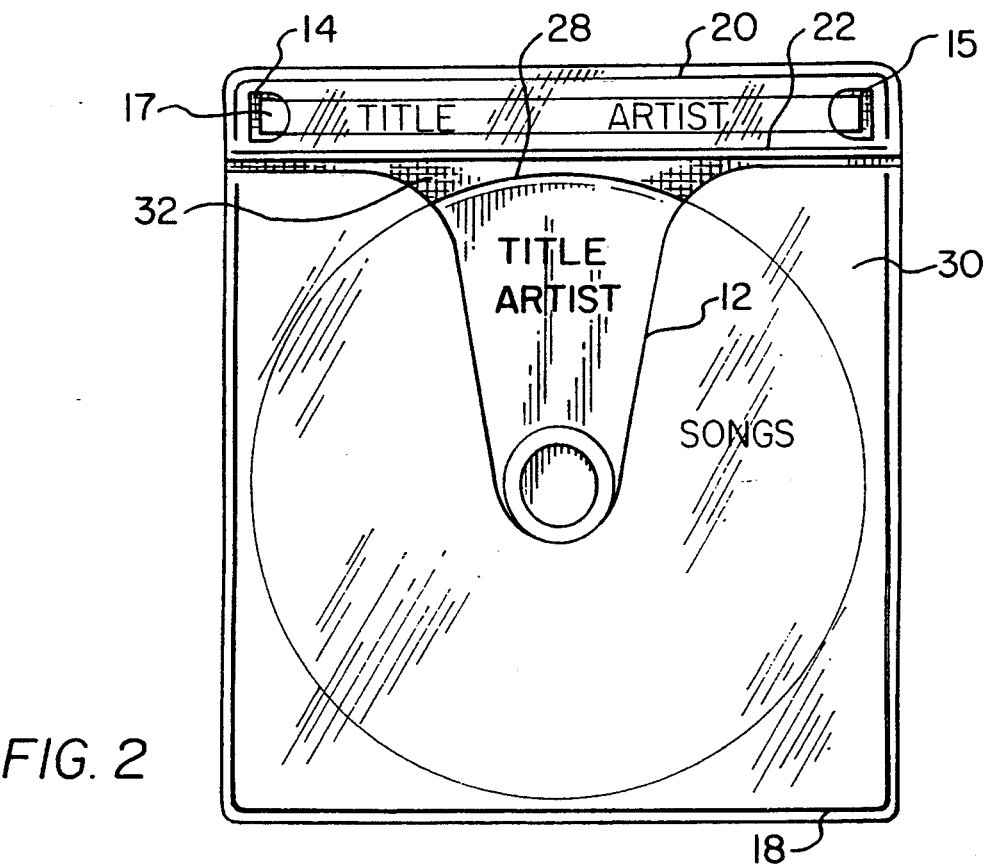
FIG. 2 is a front view of the invention showing a CD and an associated title bar inserted in two pockets that are provided by the invention.

FIG. 2 is a front view of the invention with CD 28 and title bar 17 inserted in the two above-mentioned pockets. Title bar 17 is inserted between layer 30 and layer 32 through either cutaway 14 or cutaway 15. Title bar 17 is retained in a pocket that is formed between layer 30 and layer 32, this pocket being bounded by heat seals 20 and 22. CD 28 is retained in a pocket that is bounded by U-shaped heat seal 18.

Figure 3:
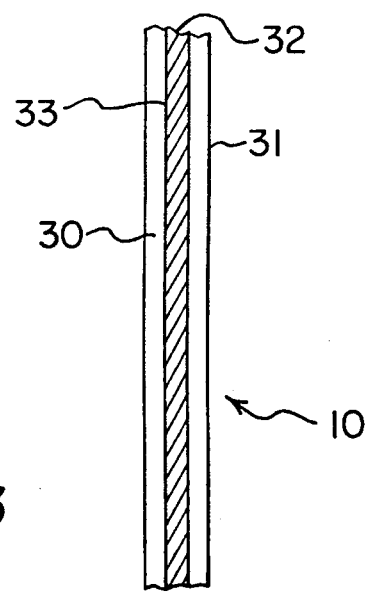
FIG. 3 is a side section view of a portion of the invention showing the three ply construction thereof.
Figure 6:
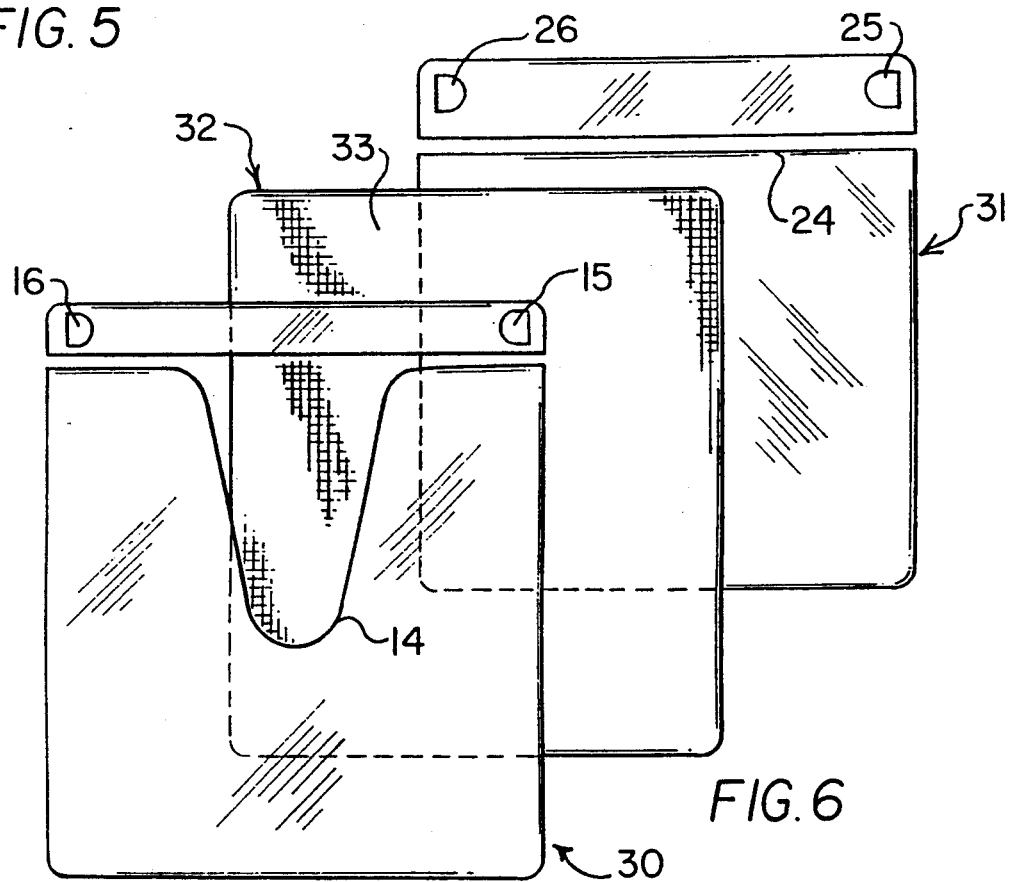
FIG. 6 is an exploded view of the invention showing its three ply construction.

FIG. 3 is a cutaway side view of a portion of the invention. Container 10 is formed by stacking three thin layers 30, 32 and 31 of flexible polypropylene material, which stacked material is then die cut to form a plurality of individual portions each having the general outline shown in FIG. 1. Each of these portions is then heat sealed together as described. FIG. 6 is an exploded view showing the three plies 30, 31 and 32. In FIG. 6, the plies 30 and 31 have been scored and cut, but heat sealing of the plies has not as yet occurred. Plies 30, 32 and 31 each comprise a rectangle, preferably, but without limitation thereto, a generally square shape, each ply having a top edge 36 about 5 inches long, a bottom edge 37 about 5 inches long, and side edges 38 and 39 each of about 5 9/16 inches long.

Top layer 30 and back layer 31 are typically formed of transparent extruded polypropylene film (for example, 5.5 millimeters thick), and have a matte finish. Second layer 32 is typically formed of opaque spun-bonded polypropylene that is laminated to a 4 millimeter thick polypropylene backing member. The spun-bonded side 33 of layer 32 is relatively soft. Side 33 is intended to face top layer 30 to thereby form one surface of the pocket wherein CD 28 is inserted.

Figure 4:
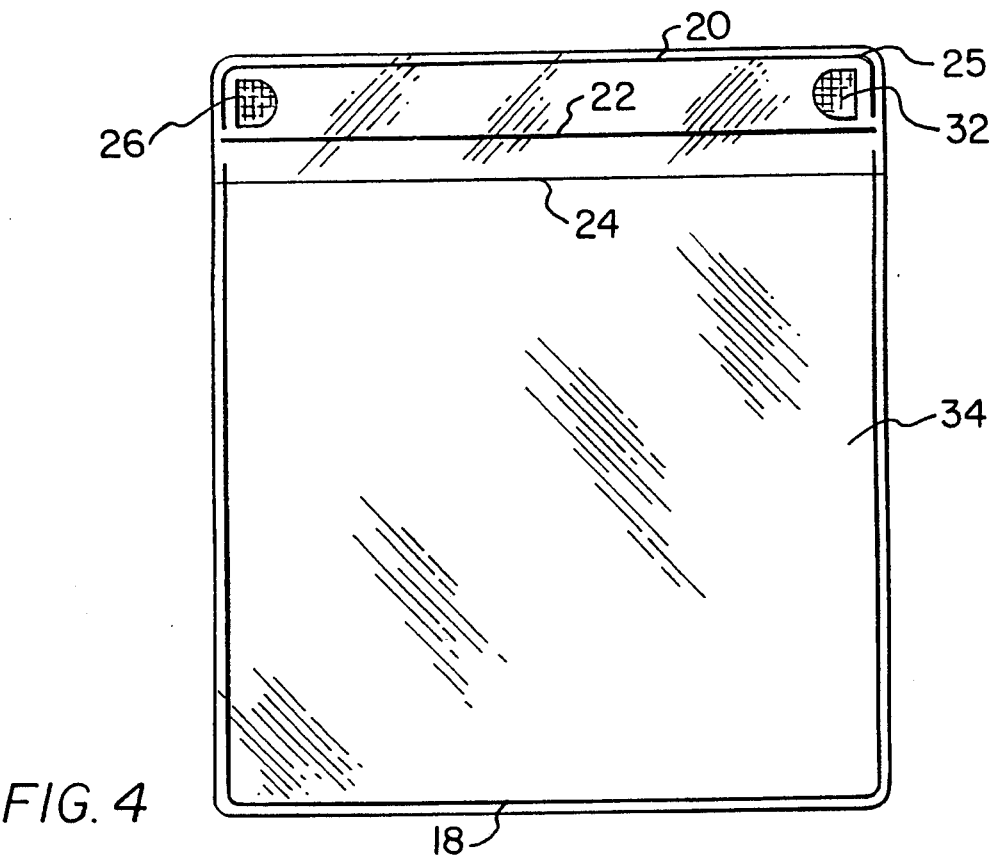
FIG. 4 is a back view of the invention.

U-shaped cutaway 12 and D-shaped cutaways 14 and 15 are die cut into top layer 30. Slot 24 and D-shaped cutaways 25 and 26 (shown in FIG. 4) are die cut into back layer 34.

Figure 5:
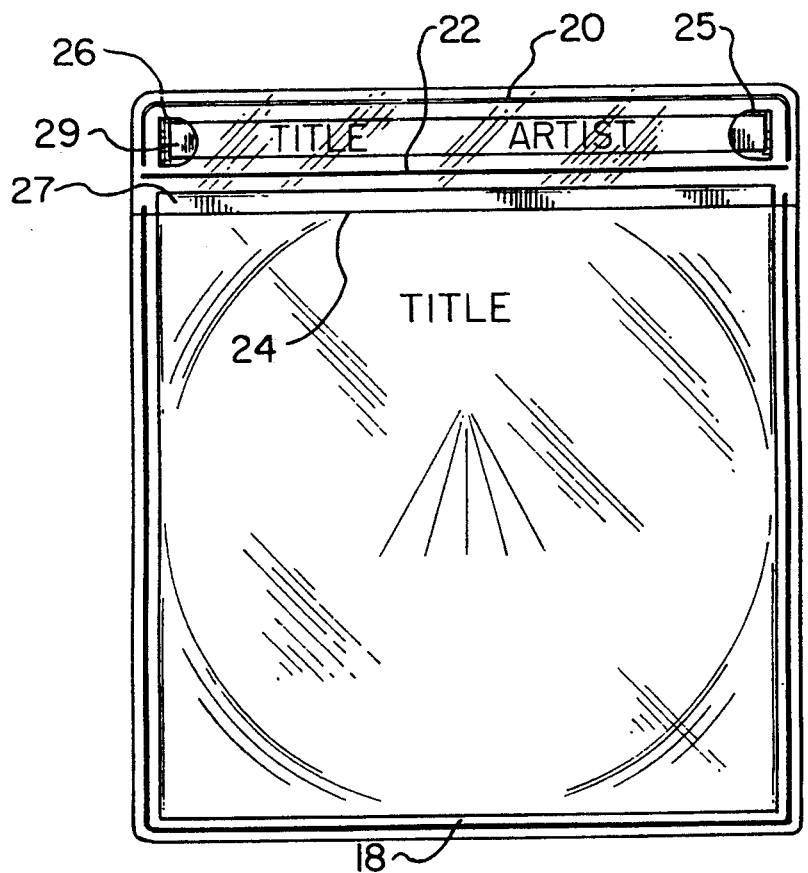
FIG. 5 is a back view of the invention showing a second title bar and a CD package insert inserted in two additional pockets that are provided by the invention.

Slot 24 permits printed CD package insert, or card 27, to be inserted into a third pocket that is formed between second layer 32 and back layer 34. This pocket is bounded by heat seal 18. A second title bar 29 (see FIG. 5) may be inserted through D shaped cutaway 25 or 26 and into a fourth pocket. Title bar 29 is retained in this fourth pocket by heat seals 20 and 22.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. A relatively thin and flexible container for holding a compact disc, comprising;
   a first transparent and flexible plastic film, a flexible intermediate plastic member, and a second flexible plastic film arranged in that order,
   said first film, intermediate member and second film each having a generally similar rectangular shape,
   said first film, intermediate member and second film each having a top edge, a bottom edge, a first side edge, and a second side edge,
   first sealing means binding said first film, intermediate member and second film together at said top edge, bottom edge, first side edge, and second side edge, to thereby form a unitary flexible member,
   second sealing means binding said first film to said intermediate member, said second sealing means extending generally parallel to said top edge and spaced relatively close to said top edge to thereby form an elongated first pocket between a first surface of said first film and a first surface of said intermediate member,
   a first cut formed in said first film generally adjacent to one of said side edges, said first cut enabling an elongated alphanumeric/graphic card identifying a compact disc to be inserted into said first pocket, and
   a generally U-shaped notch cut into said first film, said notch extending generally from said second sealing means at locations generally adjacent to said side edges and terminating at a location that is spaced from said bottom edge, said notch enabling a compact disc to be inserted into a second pocket between said first surface of said first film and said first surface of said intermediate member.

2. The container of claim 1 wherein first film, intermediate member and second film each comprise polypropylene, and wherein said first and second sealing means comprise line type heat seals.

3. The container of claim 2 wherein said first surface of said intermediate member is formed of a relatively soft polypropylene material.

4. The container of claim 1 wherein said second film is transparent, and including,
   a second cut formed in said second film generally adjacent to said top edge and extending generally parallel to said top edge, said second cut enabling a flat alphanumeric/graphic card identifying a compact disc to be inserted into a third pocket between a first surface of said second film and a second surface of said intermediate member.

5. The container of claim 4 including;
   third sealing means binding said second film to said intermediate member,
   said third sealing means being located intermediate said second cut and said top edge,
   said third sealing means extending generally parallel to said top edge and spaced relatively close to said top edge to thereby form an elongated fourth pocket between said first surface of said second film and said second surface of said intermediate member, and a third cut formed in said second film generally adjacent to one of said side edges, said third cut enabling an elongated alphanumeric/graphic card identifying a compact disc to be inserted into said fourth pocket.

6. The container of claim 5 wherein first film, intermediate member and second film each comprise polypropylene, and wherein said first, second and third sealing means comprise line type heat seals.

7. The container of claim 6 wherein said second and third sealing means comprise one heat seal.

8. The container of claim 7 wherein said first surface of said intermediate member is formed of a relatively soft polypropylene material.

9. The container of claim 1 including;
third sealing means binding said second film to said intermediate member, said third sealing means extending generally parallel to said top edge and spaced relatively close to said top edge to thereby form a second elongated pocket between a first surface of said second film and a second surface of said intermediate member.

10. The container of claim 9 including;
a third cut formed in said second film generally adjacent to one of said side edges, said third cut enabling an elongated alphanumeric/graphic card identifying a compact disc to be inserted into said second elongated pocket.

11. The container of claim 10 wherein said first surface of said intermediate member is relatively soft.

12. The container of claim 11 wherein said second and third sealing means are generally coincident.

13. The container of claim 12 wherein first film, intermediate member and second film each comprise polypropylene, and wherein said first, second and third sealing means comprise line type heat seals.

* * * * *